(12) United States Patent
Behzadpour et al.

(10) Patent No.: US 11,878,793 B2
(45) Date of Patent: Jan. 23, 2024

(54) ALL NEW MULTI-PURPOSE INTERNALLY STIFFENED COMPOSITE WING SUB-PANEL

(71) Applicant: The Boeing Company, Chicago, IL (US)

(72) Inventors: Forouzan Behzadpour, Woodinville, WA (US); Patrick B. Stickler, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 37 days.

(21) Appl. No.: 17/387,193

(22) Filed: Jul. 28, 2021

(65) Prior Publication Data

US 2022/0111948 A1 Apr. 14, 2022

Related U.S. Application Data

(60) Provisional application No. 63/057,986, filed on Jul. 29, 2020.

(51) Int. Cl.
| | |
|---|---|
| *B64C 3/00* | (2006.01) |
| *B29C 70/00* | (2006.01) |
| *B29D 99/00* | (2010.01) |
| *B64C 3/20* | (2006.01) |
| *B64C 3/26* | (2006.01) |
| *B29C 70/08* | (2006.01) |
| *B29C 70/38* | (2006.01) |
| *B64C 3/18* | (2006.01) |
| *B29L 31/30* | (2006.01) |

(52) U.S. Cl.
CPC .............. *B64C 3/20* (2013.01); *B29C 70/086* (2013.01); *B29C 70/386* (2013.01); *B29D 99/0014* (2013.01); *B64C 3/182* (2013.01); *B64C 3/26* (2013.01); *B29L 2031/3085* (2013.01)

(58) Field of Classification Search
CPC .... B64C 3/00; B64C 3/10; B64C 3/18; B64C 3/182; B64C 3/20; B64C 3/26; B29C 70/00; B29C 70/08; B29C 70/086; B29C 70/30; B29C 70/38; B29C 70/386; B29D 99/00; B29D 99/001; B29D 99/0014
See application file for complete search history.

(56) References Cited

U.S. PATENT DOCUMENTS

| | | | |
|---|---|---|---|
| 2019/0016436 A1* | 1/2019 | Stickler | B64C 1/064 |
| 2020/0086970 A1* | 3/2020 | Behzadpour | B64C 27/473 |
| 2021/0064720 A1* | 3/2021 | Behzadpour | G06F 30/27 |

* cited by examiner

*Primary Examiner* — Jacob T Minskey
*Assistant Examiner* — Matthew Hoover
(74) *Attorney, Agent, or Firm* — GATES & COOPER LLP

(57) ABSTRACT

A panel including an outer face sheet; an inner face sheet; a foam disposed between the outer face sheet and the inner face sheet; and a core structure (e.g., a stringer comprising a hat structure) between the foam and the inner face sheet; and between the foam and the outer face sheet. The core structure is protected from impact damage and increases flexural stiffness of the panel on an aircraft wing.

20 Claims, 9 Drawing Sheets

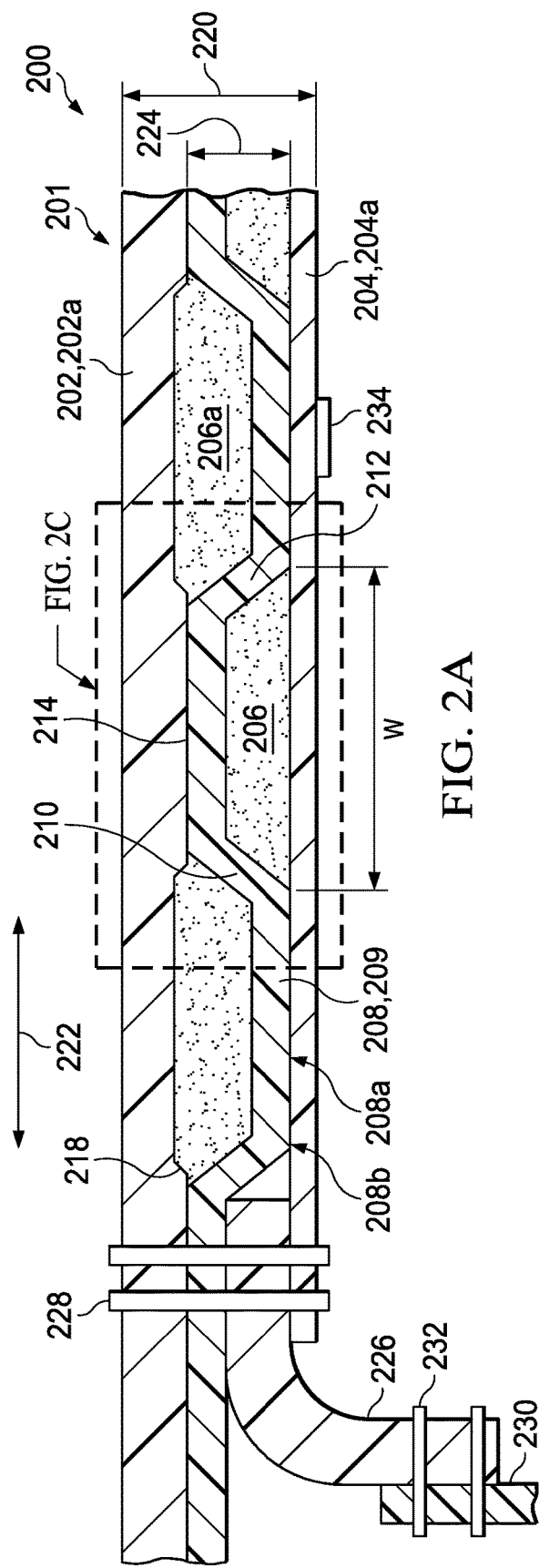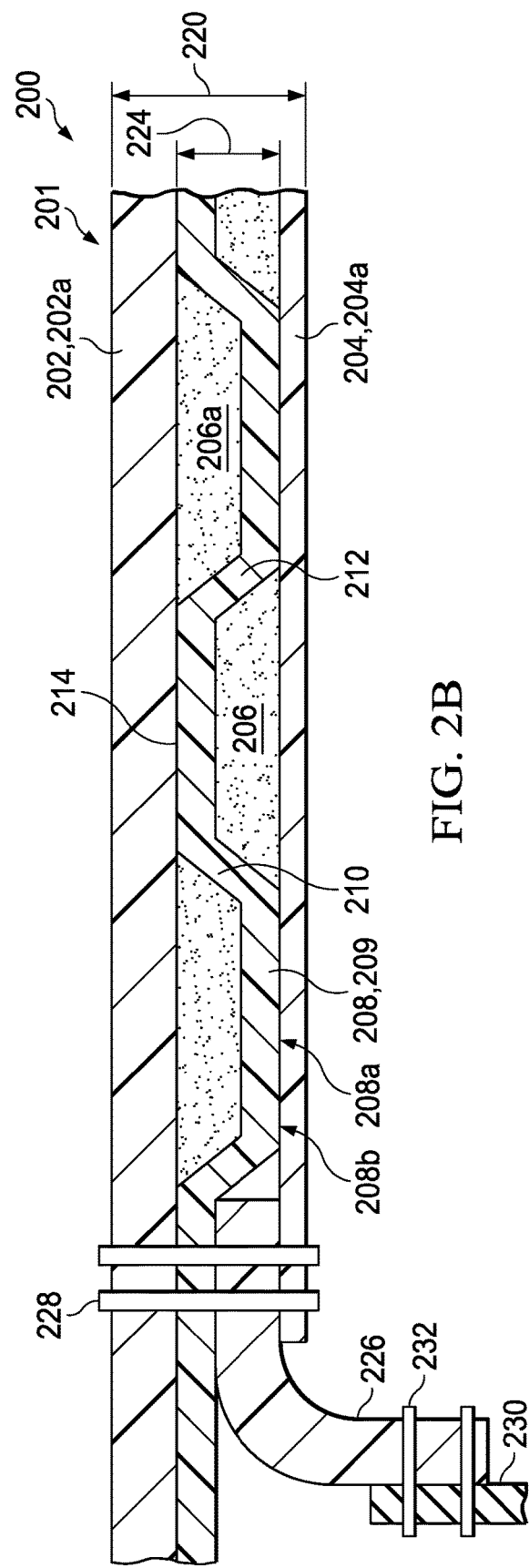
FIG. 2A
FIG. 2B

ALL NEW MULTI-PURPOSE INTERNALLY STIFFENED COMPOSITE WING SUB-PANEL

CROSS REFERENCE TO RELATED APPLICATIONS

This application claims the benefit under 35 U.S.C. Section 119(e) of commonly-assigned U.S. Provisional Patent Application No. 63/057,986, filed Jul. 29, 2020, by Forouzan Behzadpour and Patrick B. Stickler, entitled "AN ALL NEW MULTI-PURPOSE INTERNALLY STIFFENED COMPOSITE WING SUB-PANEL,", which application is incorporated by reference herein.

BACKGROUND

1. Field

The present disclosure relates to systems and methods for manufacturing panels for an aircraft wing.

2. Description of the Related Art

FIG. 1 is a schematic representation of a typical construction of the interior structure of an aircraft wing 12. The interior structure of the wing 12 includes a framework of spars 14 and ribs 16 that are contained inside the exterior skin 18 of the wing. The spars 14 run the length of the wing from a fuselage end or root end 22 of the wing 12 to a tip end 24 of the wing.

The spars 14 and ribs 16, together with stringers attached to the exterior skin, provide structural support for the wing. The stringers comprise structural support members that attach to the exterior skin 18 so as to transfer the bending loads acting on the wing 12 onto the internal structures such as the ribs 16 and spars 14. In various conventional wings, the exterior skin 18 comprises composite panels (manufactured with prepreg tapes) that closely resemble their aluminum counterparts and therefore exhibit the weaknesses of the composite panels. Moreover, the stringers comprise open section stringers, a carry-over from aluminum wings, that are incompatible with the prepreg tape in the composite panels. Therefore, conventional composite panels are prone to defects and excessive warpage when loads are applied. Moreover, the resulting composite panel has dimensions that deviate from the design specifications. With warpage, composite panels may not fit with other composite parts as desired when assembling the parts for the aircraft.

None-the-less, warpage of composite panels is considered an acceptable manufacturing deficiency that can be addressed through the use of shims to align parts. However, the installation of shims is time-consuming and expensive and also adds weight to the aircraft. Moreover, the use of shims does not address the problem of reduced strength of the composite panel or low pull off strength of the stringers due to the warping and formation of noodle cracking in the stringers.

Thus, there exists a need for composite panels that have increased strength, reduced weight, and reduce the need for intensive labor during manufacturing. Embodiments of the present disclosure satisfy this need.

SUMMARY

The present disclosure describes a novel panel, a wing including a plurality of the panel, and an airplane including the wing. The panel and wing is embodied in many ways, including but not limited to, the following.

1. An apparatus, comprising:
   one or more panels each including:
   an outer face sheet comprising a plurality of first composite materials;
   an inner face sheet comprising a plurality of second composite materials;
   a foam disposed between the outer face sheet and the inner face sheet; and
   a core structure comprising a plurality of third composite materials:
   between the foam and the inner face sheet; and
   between the foam and the outer face sheet, wherein the core structure is protected from impact damage and the core structure increases flexural stiffness of the panel.

2. The apparatus of example 1, wherein:
   the foam comprises a plurality of foam pieces and the core structure comprises a hat structure comprising a plurality of hat shaped sections,
   each of the hat shaped sections comprise a first sidewall, a second sidewall, and a wall, and
   each of the hat shaped sections enclose and locate one of the foam pieces between:
   the inner face sheet, the first sidewall, the second sidewall, and the wall, or
   the outer face sheet, the first sidewall, the second sidewall, and the wall.

3. The apparatus of example 2, wherein the outer face sheet comprises a plurality of first plies including a plurality of first fiber tows and the inner face sheet comprises a plurality of second plies including a plurality of second fiber tows.

4. The apparatus of example 3, wherein the hat structure comprises a fabric including a plurality of third fiber tows.

5. The apparatus of example 4, wherein the inner face sheet, the outer face sheet, and the hat structure are co-cured and the foam comprises a material that does not degrade at a temperature of at least 350 degrees Fahrenheit (e.g., at least 176 degrees Celsius).

6. The apparatus of example 2, wherein the outer face sheet includes a plurality of recesses, each of the recesses seating and locating one of the foam pieces.

7. The apparatus of example 2, wherein the plurality of first composite materials, the plurality of second composite materials, or the plurality of first composite materials and the plurality of second composite materials have a higher stiffness in first regions between the foam pieces as compared to in second regions above or below the foam pieces.

8. The apparatus of example 1, wherein the core structure comprises a stringer sandwiched between the inner face sheet and the outer face sheet.

9. The apparatus of example 1, wherein the panel has a thickness T in a range of 1-5 inches (e.g., 1 inches≤T≤5 inches or 2.5 centimeters (cm)≤T≤13 cm).

10. The apparatus of example 9, wherein the core structure comprises a hat shaped section having a height H in a range of 1/10 inch to 5 inches (e.g., 0.25 cm≤H≤13 cm or 1/10 inch≤H≤5 inches).

11. The panel of example 1, wherein the foam has a density D in a range of 3-15 pounds per cubic foot (lbs/ft$^3$) (e.g., 3 lbs/ft$^3$≤D≤15 lbs/ft$^3$ or 48 kg/m$^3$≤D≤241 kg/m$^3$ where kg/m$^3$ is kilograms per cubic meter) and/or a thickness t in a range in a range of 0.5"<t<2.5" (e.g., 1.2 cm≤t≤6.4 cm).

12. The panel of example 1, wherein the core structure includes a plurality of hat shaped sections having an aspect ratio and periodicity and the foam comprises foam pieces having dimensions and composition such that the panel has increased flexural stiffness as compared to the panel without the foam and without the hat shaped section.

13. The panel of example 1, wherein the core structure includes a plurality of hat shaped sections having an aspect ratio and a periodicity and the foam comprises foam pieces having dimensions and composition such that a combination of the inner face sheet and the core structure has a first flexural stiffness (under tension) of at least 40% of a second flexural stiffness (under compression) of the outer face sheet and the inner face sheet does not buckle under a load experienced by a wing including the panel on an aircraft during flight.

14. A wing box comprising the apparatus of example 1, comprising:
the panels including a first panel and a second panel;
a first spar chord attached to the first panel;
a second spar chord attached to the second panel; and
a first spar connecting the first spar chord and the second spar chord.

15. The apparatus of example 15, wherein the first spar, the first spar chord, and the second spar chord each comprise a fabric including a fourth plurality of fiber tows.

16. A wing comprising the apparatus of example 1, comprising:
the panels comprising a first panel and a second panel;
a base skin including the first panel;
a top skin including the second panel;
a wing box including:
    a forward spar section including:
        a first spar chord attached to the first panel at a first position;
        a second spar chord attached to the second panel at a second position; and
        a first spar connecting the first spar chord and the second spar chord; an aft spar section including:
        a third spar chord attached to the first panel at a third position;
        a fourth spar chord attached to the second panel at a fourth position; and
        a second spar connecting the third spar chord and the fourth spar chord; and
wherein:
the first spar and the second spar each extend along a length of an interior of the wing between a root end of the wing and a tip end of the wing; and
the first spar and the second spar each intersect with a plurality of ribs directly attached to the base skin and the top skin; and
each of the ribs are located within the wing box at a plurality of different locations along the length of the wing.

17. An aircraft comprising the wing of example 16.

18. A method of making a panel, comprising:
laying first face sheet comprising a plurality of first fiber tows disposed in a first tape;
laying a plurality of first foam pieces on the first face sheet;
laying a core structure on the plurality of first foam pieces, the core structure comprising a plurality of third fiber tows;
laying a plurality of second foam pieces on the core structure;
laying a second face sheet, including a plurality of second fiber tows disposed in a second tape, on the plurality of second foam pieces so as to form a structure including the first face sheet, the second face sheet, the core structure, and the foam pieces, wherein the first tape, the second tape, and the core structure are pre-impregnated with resin prior to the laying or comprise preforms with the resin infused after the laying; and
curing the structure combined with the resin in an autoclave at a pressure and temperature of at least 300 degrees Fahrenheit, so as to form the structure into a panel having an aerodynamic surface, wherein the foam pieces and the core structure prevent or reduce warping, buckling or collapse of the first face sheet and the second face sheet and the aerodynamic surface under the pressure.

19. The method of example 18, wherein the first face sheet, the second face sheet, and the core structure are co-bonded and co-cured.

20. The method of example 18, wherein the core structure comprises a stringer.

BRIEF DESCRIPTION OF THE DRAWINGS

FIG. 2A illustrates a cross-section of an example panel stiffened with stringers and including composite materials, wherein the panel is configured as a panel on a wing of a larger airplane (e.g., Boeing 777) and for manufacturing at a lower production rate.

FIG. 2B illustrates a cross section of an example panel stiffened with stringers and including composite materials, wherein the panel is configured as a panel on a wing of a medium or smaller airplane (e.g., Boeing 737) and for manufacturing at a higher production rate as compared to the production rate for the panel in FIG. 2A.

DESCRIPTION

Figure 1:
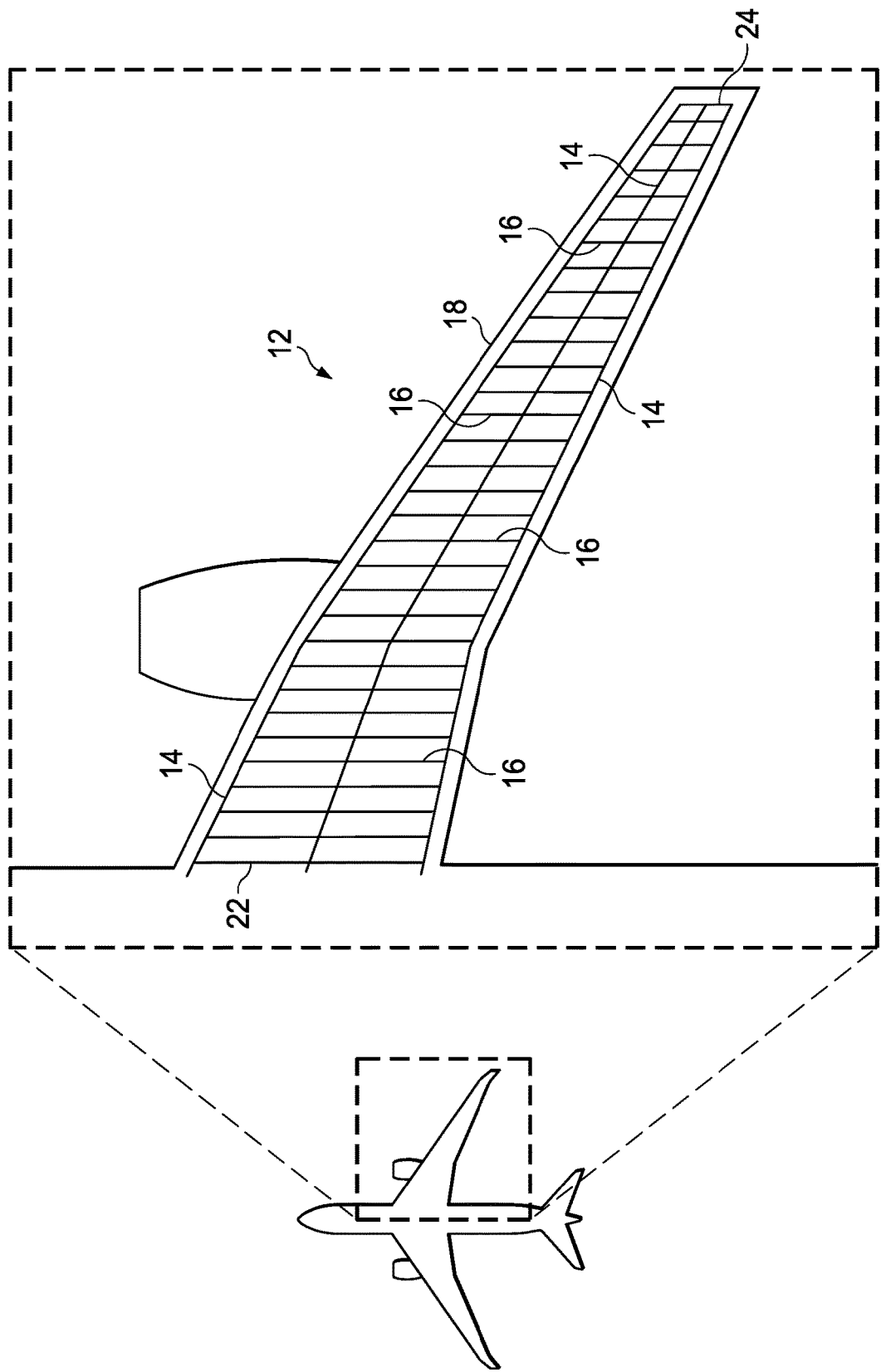
FIG. 1 is a schematic representation of the interior structure of a prior art aircraft wing comprising a framework of spars and ribs.

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes a novel panel comprising an outer face sheet and an inner face sheet; a foam disposed between the outer face sheet and the inner face sheet; and a core structure (e.g. a stringer) sandwiched between the foam and the inner face sheet and between the foam and the outer face sheet. In various examples, the sandwich structure comprises composite materials and a structure that harmonizes three major design criteria including stiffening of the panel, sizing of the panel, and conformation with inherent behavior, capabilities, and characteristics of the composite materials, so as to take advantage of the strength of the composite materials while avoiding or mitigating weaknesses of the composite materials. In one example, the panel comprises a lower panel on a wing and the outer face sheet and the inner face sheet form the split skin interleaved with the core structure comprising a stringer, so that the split skin protects the lower panel from splitting caused by accidental large notch damage. In another example, the panel is an upper panel on the wing and the outer face sheet and the inner face sheet forming the split skin protect the stringers from accidental impact damage. In one or more further examples, the panel is adapted for airplanes of different categories and sizes, and/or the panel's dimensions and/or structure are tailored considering different requirements for stiffness, production rate, and ease of manufacturing of the panel.

Example Panel Structure

FIG. 2A and FIG. 2B illustrate a panel 200 comprising a skin 201 (e.g., a split skin) including an outer face sheet 202 (or outer layer or exterior skin 202a) and an inner face sheet 204 (or inner layer or inner skin 204a); a foam 206 disposed between the outer face sheet 202 and the inner face sheet 204; and a core structure 208 supporting the outer face sheet 202 and the inner face sheet 204 and sandwiched (1) between the foam 206 and the inner face sheet 204; and (2) between the foam 206 and the outer face sheet 202. The foam 206 comprises a plurality of foam pieces 206a (e.g., foam sections or foam portions).

Example core structures include, but are not limited to, a stringer 209 or hat structure 208a. FIG. 2A and FIG. 2B illustrate an example including a stringer 209 having the hat structure 208a including a plurality of hat shaped sections 208b each comprising a first sidewall 210, a second sidewall 212, and a wall 214 or platform connecting the first sidewall 210 and the second sidewall 212. Each of the hat sections enclose and/or embed and/or locate one of the foam pieces 206a (e.g., in a cavity) between (1) the inner face sheet 204, the first sidewall 210, the second sidewall 212, and the wall 214, or (2) the outer face sheet 202, the first sidewall 210, the second sidewall 212, and the wall 214.

FIG. 2A illustrates an example wherein the outer face sheet 202 also includes a plurality of recesses 218, each of the recesses 218 seating and locating one of the foam pieces 206a, e.g., so that the foam pieces 206a are embedded in the panel. FIG. 2B illustrates a panel without the recesses 218.

Example dimensions for the panel include, but are not limited to, the panel having a thickness 220 in a range of 1-5 inches (e.g., 1 inches$\leq$T$\leq$5 inches or 2.5 cm$\leq$T$\leq$13 cm), a length 222, a width W2 (perpendicular to the length 222) in a range of 3-12 inches (e.g., 3 inches W2$\leq$12 inches or 7.6 cm$\leq$W2$\leq$30.4 cm, and the hat structure 208a including the hat shaped section 208b having a height 224 and/or width W in a range of 1/10 inch to 5 inches (e.g., 0.25 cm$\leq$H, W$\leq$13 cm or 1/10 inch$\leq$H, W$\leq$5 inches).

In one or more examples, the foam pieces include a taper. For example, each of the foam pieces are shaped to fit conformally with the first sidewall 210, the second sidewall 212, and the wall 214. In one or more examples, the first sidewall 210 and the second sidewall 212 are inclined at an angle (with respect to the wall 214) in a range of 90-130 degrees.

Also illustrated in FIG. 2A are one or more spar chords 226 secured between the inner face sheet 204 and the core structure 208 using first fasteners 228; one or more spars 230 (e.g., having a spar web or spar upright) secured to the one or more spar chords 226 using second fasteners 232; and a bracket 234.

Example Ply and Fabric Configurations

In various examples, the outer face sheet 202 (exterior skin 202a), the inner face sheet 204 (inner skin 204a), and the core structure 208 each comprise one or more composite materials including fiber tows disposed in plies or fabric. In one or more examples, the outer face sheet 202 and the inner face sheet 204 each comprise a plurality of the plies comprising tapes and the hat structure 208a or core structure 208 comprises fabric.

Figure 2C:
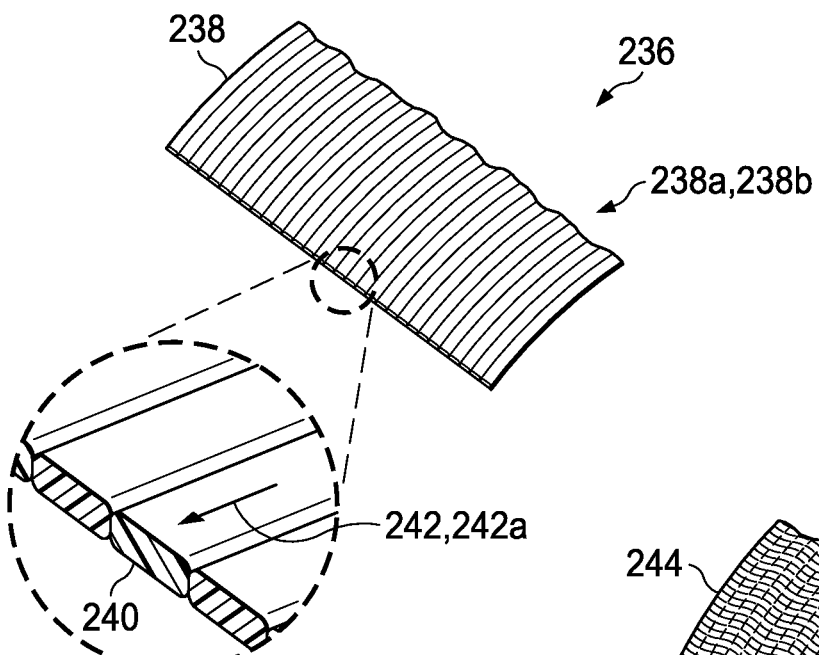
FIG. 2C illustrates an example ply or tape comprising fiber tows.
Figure 2D:
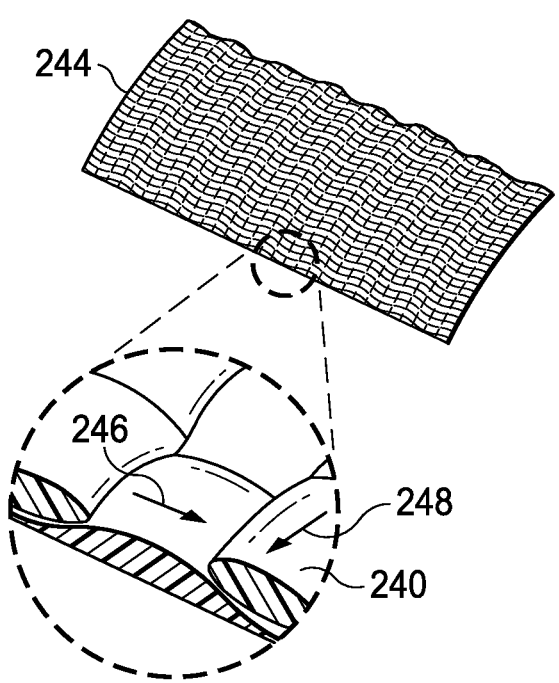
FIG. 2D illustrates an example fabric including fiber tows.
Figure 2E:
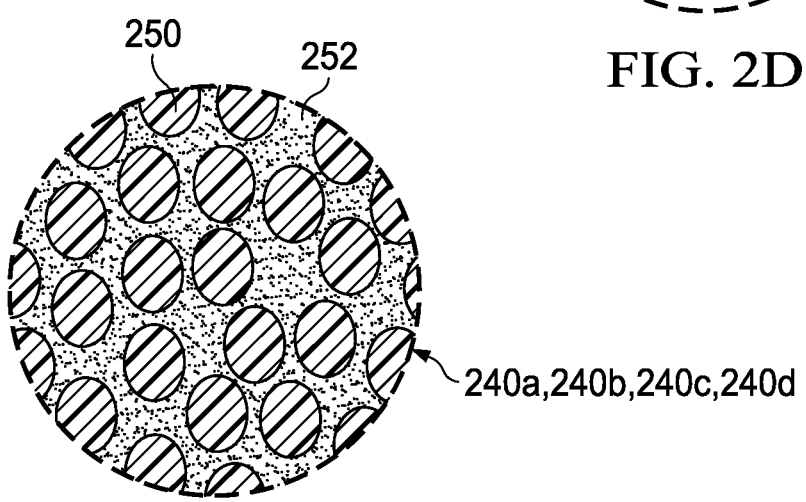
FIG. 2E is a cross sectional schematic of an example fiber tow.

FIG. 2C illustrates an example ply 236 comprising a tape 238, the tape 238 including fiber tows 240 aligned along an alignment direction 242. In various examples, the fiber tows 240 are aligned along the alignment direction 242 comprising a 0 degree orientation 242a or a 45 degree orientation. FIG. 2D illustrates a fabric 244 comprising fiber tows 240 aligned in a first direction 246 and fiber tows 240 aligned in a second direction 248, wherein the fiber tows aligned in the first direction 246 and the fiber tows aligned in the second direction 248 are woven together to form the fabric. FIG. 2E illustrates the fiber tows 240 comprise filaments 250 combined with a resin 252.

Example materials for the fiber tows include, but are not limited to, materials comprising or consisting essentially of, glass, fused silica, fiberglass, metal, carbon fiber, carbon, boron, metal, mineral and polymer, etc. Examples of the polymers include, but are not limited to, thermoplastics, such as polyamide, polyetherketone (PEK), polyether ether ketone (PEEK), polyetherketoneketone (PEKK), Polyetherimide (PEI), or hybrid forms of thermoplastics, with modifiers and/or inclusions such as carbon nanotube(s), graphene, clay modifier(s), discontinuous fiber(s), surfactant(s), stabilizer(s), powder(s) and particulate(s).

Figure 2F:
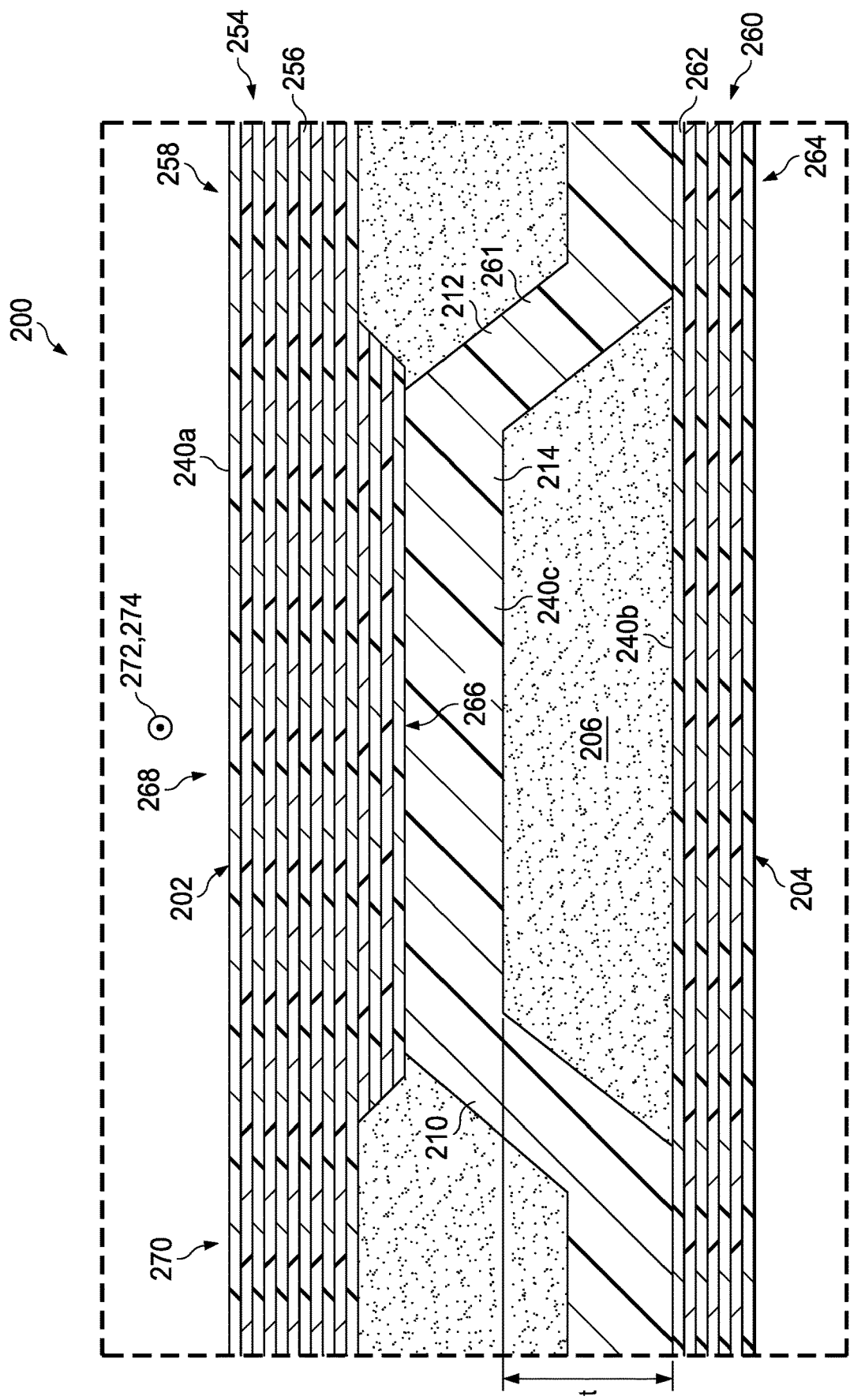
FIG. 2F is a cross-sectional schematic of an example panel including a plurality of plies.

FIG. 2F illustrates the outer face sheet 202 or exterior skin 202a comprises a plurality of first composite materials 254 including a plurality of first plies 256 (e.g., each comprising the tape 238 comprising a first tape 238a and a plurality of the fiber tows 240 comprising first fiber tows 240a) having a first stacking sequence 258 (e.g., defined as the number of plies and/or orientation of fiber tows in each of the plies), and the inner face sheet 204 or inner skin 204a comprises plurality of second composite materials 260 including a plurality of second plies 262 (e.g., each comprising the tape 238 comprising a second tape 238b and a plurality of the fiber tows 240 comprising second fiber tows 240b) having a second stacking sequence 264 (e.g., defined as the number of plies and/or orientation of fiber tows in each of the plies). The core structure 208 includes a plurality of third composite materials 261 comprising a plurality of the fiber tows 240 comprising third fiber tows 240c.

In one or more examples, the first stacking sequence 258 and the second stacking sequence 264 are tailored to achieve a predetermined stiffness and the structural efficiency of the panel 200 (e.g., as configured for the panel on an airplane wing). In one or more examples, stiffness is defined as the displacement (in meters) of the panel produced by a force along the same direction in which the force is applied (e.g., units Newtons per meter). For example, flexural stiffness is the stiffness when the force is applied along the direction perpendicular to the panel's surface. In one or more examples, structural efficiency is defined as the mass of the panel divided by the maximum mass supported by the panel.

FIG. 2F further illustrates an example wherein the panel 200 comprises a plank stiffened panel 266 comprising the inner face sheet 204 or the outer face sheet 202 in physical contact with the stringer 209 in first regions 268 between the foam pieces 206a, and the plurality of first composite materials 254, the plurality of second composite materials 260, or the plurality of first composite materials and the plurality of second composite materials having a higher stiffness in the first regions 268 as compared to in second regions 270 above or below the foam pieces 206a. In one or more examples, the higher stiffness in the first regions 268 is achieved by the first regions 268 having a higher number of first plies 256 or second plies 262 (as compared to in the number of first plies 256 or second plies 262 in the second regions 270) and/or using a higher number of the first plies 256 and second plies 262 with zero degree orientation 242a and such that the fiber tows 240 are oriented or aligned along a direction 272 of the load 274 on the panel.

Example Foam Materials

In various examples, the foam 206 comprises a lightweight material that does not degrade at a temperature of at least 350 degrees Fahrenheit or at a temperature used during curing of the composite materials in the outer face sheet 202, the inner face sheet 204 and the core structure 208. Example materials include, but are not limited to, a foam or a material (e.g., a polymer such as, but not limited to, polymethylacrylimide, polyurethane, polyvinyl chloride) comprising or enclosing a cellular structure. The cellular structure includes cells having cell walls (e.g., polymer cell walls) enclosing gas (e.g., air) resulting from introduction of gas bubbles during manufacture. In one or more examples, the foam 206 comprises a plurality of closed cells which are not accessed by any resin applied to the foam 206 (surface cells may be accessed by the resin). Example foams include Rohacell™, Rohacell Hero™, and Rohacell Hero 110™. In one or more examples, the foam 206 is selected to withstand a plurality of thermal cycles (e.g., at least 2000 cycles) between −45° C. to 75° C. (−49° F.-167° F.) and to have a heat resistance up to at least 430 degrees Fahrenheit (e.g. up to at least 221° C.). In one or more examples, the foam 206 has a density in a range of 3-15 pounds per cubic feet (lbs/ft³) (e.g., 3 lbs/ft³≤D≤15 lbs/ft³ or 48 kg/m³≤D≤241 kg/m³ where kg/m³ is kilograms per cubic meter) and/or a thickness t in a range in a range of 0.5"<t<2.5" (e.g., 1.2 cm≤t≤6.4 cm).

Example Wing Box

Figure 3:
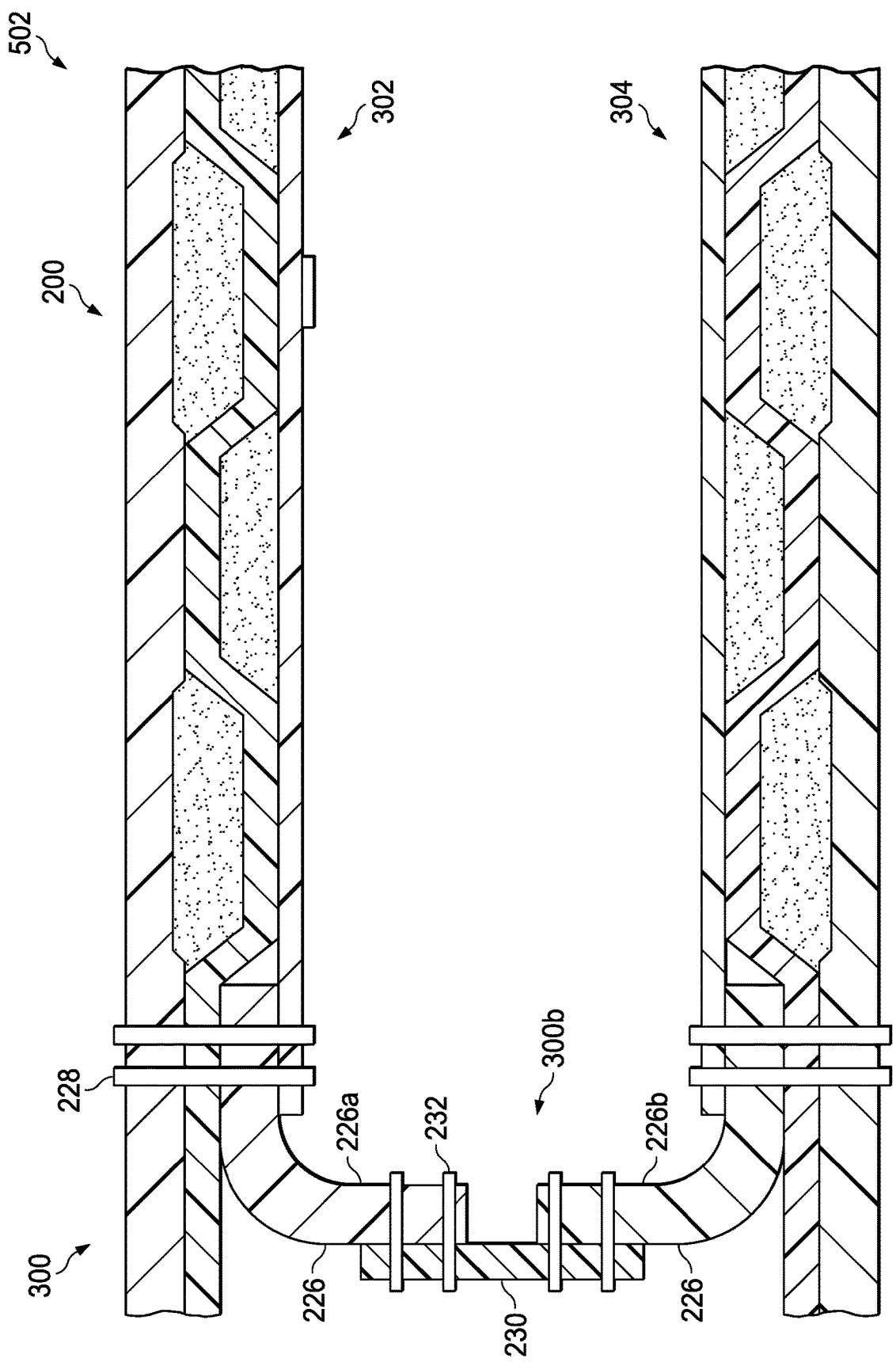
FIG. 3 illustrates an example wing box including a plurality of the panels illustrated in FIG. 2A, FIG. 2B, or FIG. 2C.

FIG. 3 illustrates a wing box 300 comprising a plurality of the panels 200 illustrated in FIG. 2A, FIG. 2B, or FIG. 2F. The wing box 300 includes a plurality of the panels 200 comprising a first panel 302 (an upper panel) and a second panel 304 (lower panel); and one or more spar sections 300b including a plurality of the spar chords 226 (comprising a first spar chord 226a attached to the first panel 302 and a second spar chord 226b attached to the second panel 304); and one of the spars 230 attached to the first spar chord 226a and the second spar chord 226b.

The first panel 302 has a first centroid C1 (position of the center of mass), the second panel 304 has a second centroid C2 (center of mass) and the spar chords 226 and the spars 230 are dimensioned so that the first centroid C1 and the second centroid C2 are separated by a distance D1 (as measured along a line joining the first centroid C1 and the second centroid C2).

Example Wing Structure

Figure 4A:
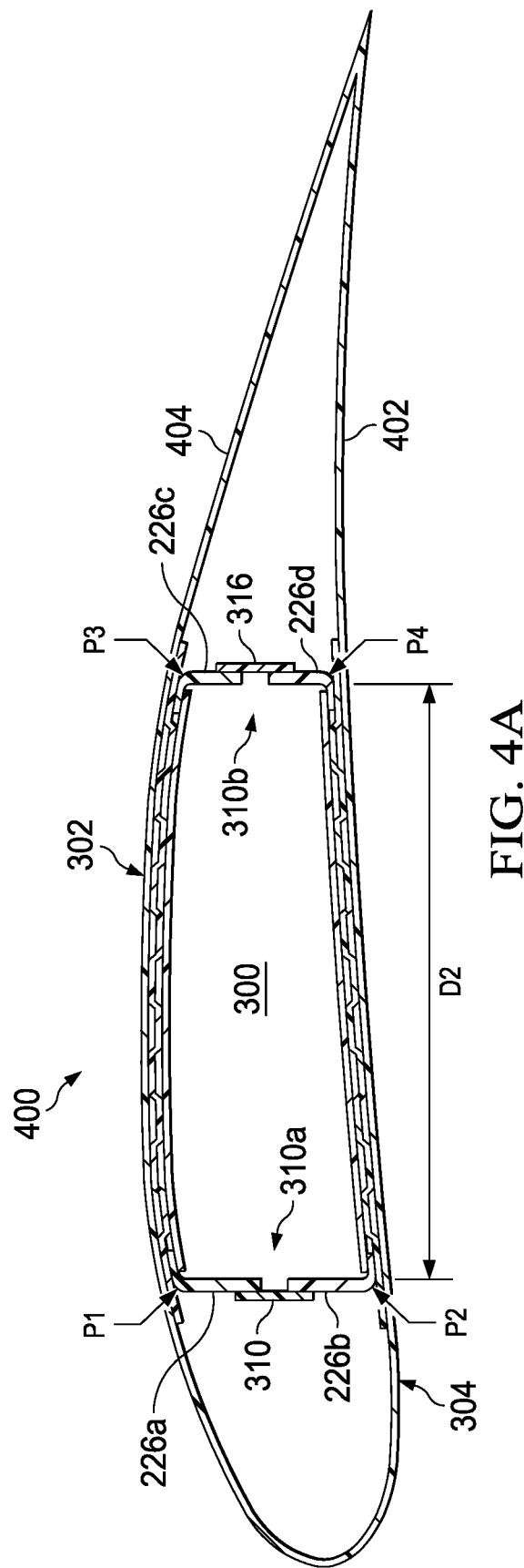
FIG. 4A is an cross-sectional view of a wing including the wing box of FIG. 3.

FIG. 4A illustrates a wing 400 comprising the wing box 300 comprising a plurality of the spar chords 226 (including a first spar chord 226a, a second spar chord 226b, a third spar chord 226c, and a fourth spar chord 226d) and a plurality of the spars 230 comprising a first spar 310 and a second spar 316. As illustrated in FIG. 4A, the wing box 300 comprises a pair of the spar sections 300b comprising a forward spar section 310a and an aft spar section 310b. The forward spar section 310a includes the first spar chord 226a attached to the first panel 302 at a first position P1; the second spar chord 226b attached to the second panel 304 at a second position P2; and the first spar 310 (forward spar) connecting the first spar chord 226a and the second spar chord 226b. The aft spar section 310b includes the third spar chord 226c attached to the first panel 302 at a third position P3; the fourth spar chord 226d attached to the second panel 304 at a fourth position P4, and the second spar 316 (aft spar) connecting the third spar chord 226c and the fourth spar chord 226d. The first position P1, the second position P2, the third position P3, and the fourth position P4 are such that the first spar 310 is separated from the second spar 316 by a distance D2 measured along the width W of the panel (in a direction perpendicular to the surfaces of the spars 230).

In one or more examples, the wing 400 comprises a base skin 402 including the second panel 304; a top skin 404 including the first panel 302; and the spar sections 300b connecting the base skin 402 to the top skin 404.

Figure 4B:
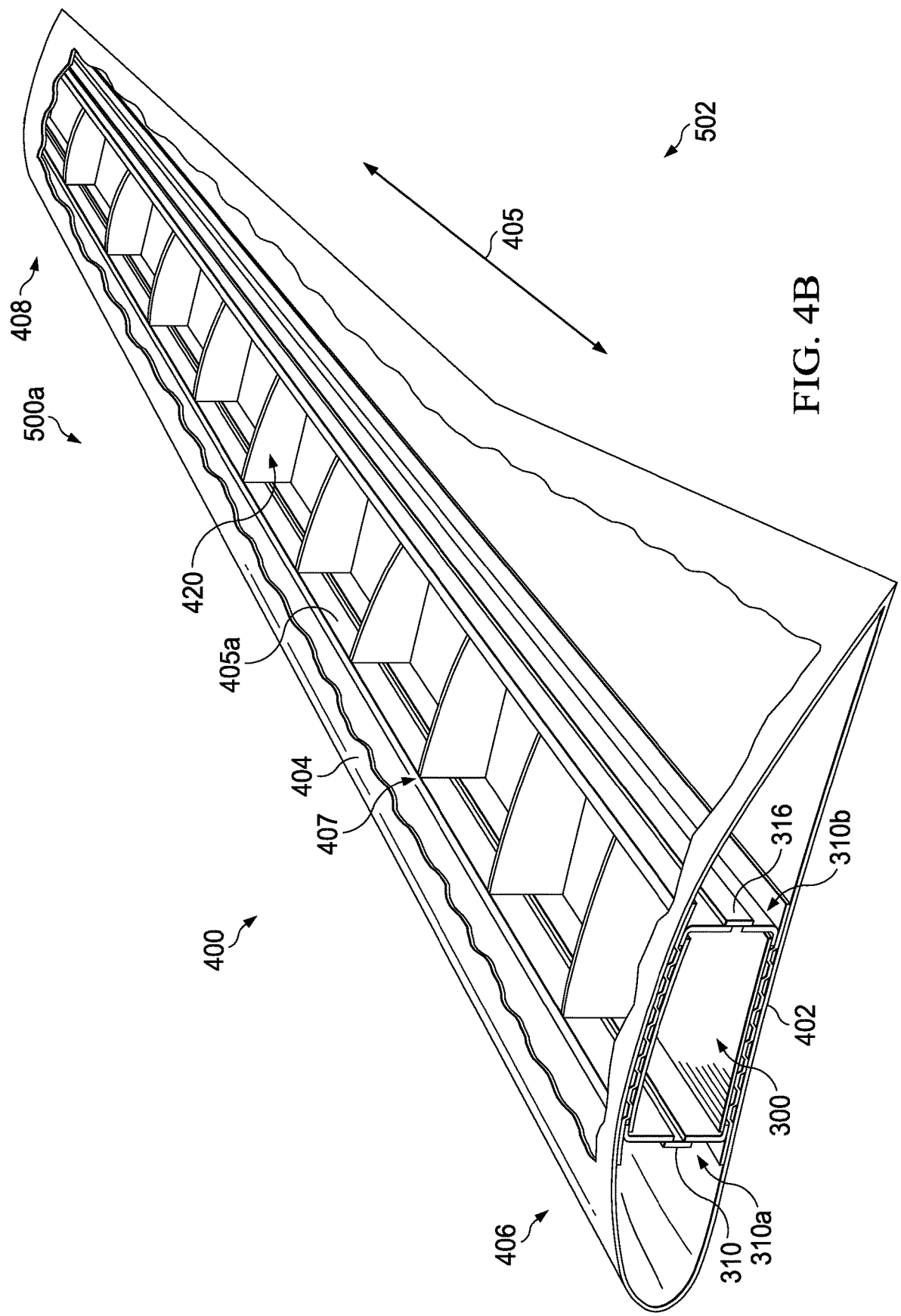
FIG. 4B is a perspective and cut-away view of a wing including the wing box illustrated in FIG. 3.

As illustrated in the example of FIG. 4B, the first spar 310 and the second spar 316 each extend along a length 405 of the interior 405a of the wing 400 between a root end 406 of the wing 400 attached to the fuselage and a tip end 408 of the wing 400. The first spar 310 and the second spar 316 each intersect with a plurality of ribs 420 directly attached to the first panel 302 in the top skin 404 and the second panel 304 in the base skin 402. Each of the ribs 420 are seated, fastened, and located within the wing box 300 at a plurality of different locations 407 along the length 405 of the wing 400 from the root end 406 to the tip end 408.

In one or more examples, the first spar 310, the second spar 316, the first spar chord 226a, the second spar chord 226b, the third spar chord 226c, the fourth spar chord 226d, and the ribs 420 each comprise a fabric 244 including a plurality of fourth fiber tows 240d.

Figure 5:
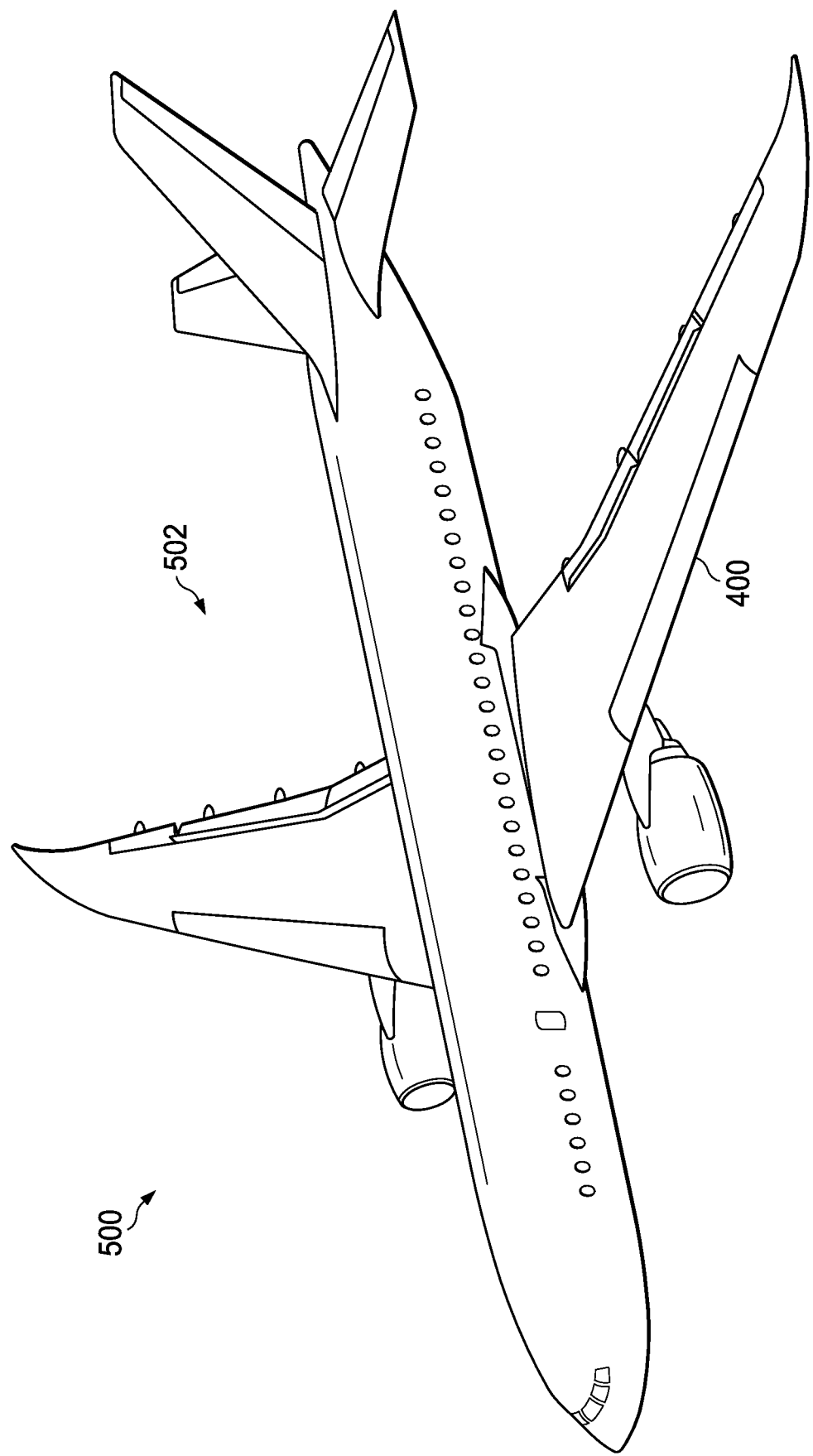
FIG. 5 is a schematic representation of an exemplary airplane including two of the wings illustrated in FIGS. 4A-4B.

FIG. 5 illustrates an airplane 500 comprising the wing 400. In various examples, the panel 200 comprises a panel on an aircraft wing, empennage or tail. In one or more examples, the panels 200 terminate at a rib comprising a surge tank rib in the wing.

Example Process Steps

Figure 6:
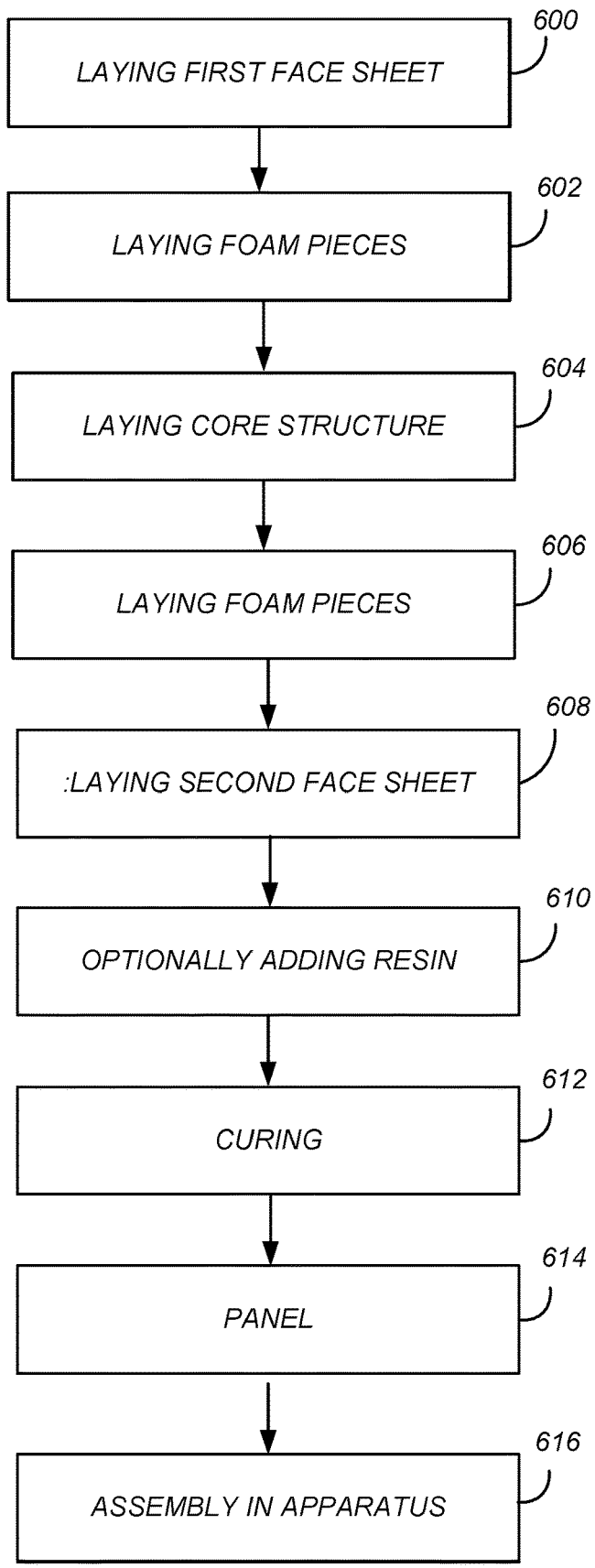
FIG. 6 is a flowchart illustrating an example method of making a panel.

FIG. 6 is a flowchart illustrating a method of making a panel (e.g., for a wing).

The method includes the following steps.

Block 600 represents laying a first face sheet comprising a plurality of first composite materials including a plurality of first fiber tows, e.g., disposed in a first tape and/or a plurality of first plies.

Block 602 represents laying a plurality of first foam pieces (e.g., foam sections or foam portions) on the first face sheet.

Block 604 represents laying a core structure on the plurality of first foam pieces, the core structure comprising the plurality of third fiber tows, e.g., disposed in a fabric.

Block 606 represents laying a plurality of second foam pieces on the core structure.

Block 608 represents laying a second face sheet, including the second plurality of composite materials including the plurality of second fiber tows (e.g., disposed in a second tape and/or a plurality of second plies), on the plurality of second foam portions so as to form a structure including the first face sheet, the second face sheet, the core structure, and the foam pieces.

In one or more examples, the foam is selected to have a coefficient of thermal expansion (CTE) that matches (e.g., within 1%) that of the composite materials in the first face sheet, a second face sheet, and the core structure. In one or more examples, the foam has a Poisson's ratio within 1% of that of the composite materials. In one or more examples, the thickness and density of the foam are selected to prevent the foam from cracking under internal stresses due to mismatches in between the CTE of the foam and the face sheets and/or core material.

In one or more examples, the foam pieces are cut and assembled into one long piece with puzzle joints between the pieces. In one or more examples, the puzzle joint comprises a gap (e.g., 0.005" gap or 0.013 cm) forming fingers that slot the foam pieces together without the use of adhesive filling the gap. In one or more examples, machined foams are dried and sealed prior to installation.

Block 610 represents optionally adding resin. In one or more examples, the first face sheet, the second face sheet, and the core structure are each provided or laid as the plurality of the composite materials pre-impregnated fabric or tape or as a fabric or tape preform with resin infusion (after laying) to form the structure.

Block 612 represents curing the structure combined with the resin in an autoclave at a pressure and temperature of at least 300 degrees Fahrenheit, so as to form the structure into a panel having an aerodynamic surface, wherein the foam pieces and the core structure prevent or reduce warping, buckling or collapse of the first face sheet and/or the second face sheet under the pressure. In this example, the first face sheet, the second face sheet, and the core structure are co-bonded and co-cured. However, in other examples, one or more of the first face sheet (e.g., inner face sheet), the second face sheet (e.g., outer face sheet), and the core structure (e.g., hat structure) may be separately bonded and/or separately cured.

Block 614 illustrates the end result, a panel (e.g., as illustrated in FIG. 2A, FIG. 2B, or FIG. 2F) comprising a sandwich structure (208*e*) including a split skin (referring also to FIGS. 3, 4A, 4B, and 5).

Examples of the wing panel include, but are not limited to, the following.

1. An apparatus (502), comprising: one or more panels (200) each including:
   an outer face sheet (202) comprising one or more (e.g., a plurality of) first composite materials (254);
   an inner face sheet (204) comprising a one or more (e.g., a plurality of) second composite materials (260);
   a foam (206) disposed between the outer face sheet (202) and the inner face sheet (204); and
   a core structure (208) comprising one or more (e.g., a plurality of) third composite materials (261):
      between the foam (206) and the inner face sheet (204); and
      between the foam (206) and the outer face sheet (202), wherein the core structure (208) is protected from impact damage and the core structure (208) increases flexural stiffness of the panel (200).

2. The apparatus of example 1, wherein:
   the foam (206) comprises a plurality of foam pieces (206*a*) and the core structure (208) comprises a hat structure (208*a*) comprising a plurality of hat shaped sections (208*b*),
   each of the hat shaped sections (208*b*) comprise a first sidewall (210), a second sidewall (212), and a wall (214), and
   each of the hat shaped sections (208*b*) enclose and locate one of the foam pieces (206*a*) between:
      the inner face sheet (204), the first sidewall (210), the second sidewall (212), and the wall (214), or
      the outer face sheet (202), the first sidewall (210), the second sidewall (212), and the wall (214).

3. The apparatus of example 2, wherein the outer face sheet (202) comprises a plurality of first plies (256) including a plurality of first fiber tows (240*a*) and the inner face sheet (204) comprises a plurality of second plies (262) including a plurality of second fiber tows (240*b*).

4. The apparatus of example 3, wherein the hat structure (208*a*) comprises a fabric (244) including a plurality (240*c*) of third fiber tows (240*c*) (e.g., aligned in the first direction 246 and the second direction 248).

5. The apparatus of example 4, wherein the inner face sheet (204), the outer face sheet (202), and the hat structure (208*a*) are co-cured and the foam (206) comprises a material that does not degrade at a temperature of at least 350 degrees Fahrenheit (e.g., at least 176 degrees Celsius).

6. The apparatus of example 2, wherein the outer face sheet (202) includes a plurality of recesses (218), each of the recesses (218) seating and locating one of the foam pieces (206*a*).

7. The apparatus of example 2, wherein the plurality of first composite materials (254), the plurality of second composite materials (260), or the plurality of first composite materials (254) and the plurality of second composite materials (260) have a higher stiffness in first regions (268) between the foam pieces (206*a*) as compared to in second regions (270) above or below the foam pieces (206*a*).

8. The apparatus of example 1, wherein the core structure (208) comprises a stringer (209) sandwiched between the inner face sheet (204) and the outer face sheet (202).

9. The apparatus of example 1, wherein the panel (200) has a thickness (220) in a range of 1-5 inches.

10. The apparatus of example 9, wherein the core structure (208) comprises a hat shaped section (208*b*) having a height (224, H) in a range of 1/10 inch to 5 inches (e.g., 0.25 cm≤H≤13 cm).

11. The panel (200) of example 1, wherein the foam (206) has a density D in a range of 3-15 pounds per cubic feet (lbs/ft$^3$) or 48 kg/m$^3$≤D≤241 kg/m$^3$ and a thickness (t) in a range in a range of 0.5"<t<2.5" (e.g., 1.2 cm≤t≤6.4 cm).

12. The panel (200) of example 1, wherein the core structure (208) includes hat shaped sections (208*b*) having an aspect ratio (e.g., width W of the hat section divided by height 224) and periodicity (e.g., number of hat shaped sections (208*b*) per unit length) and the foam (206) comprises foam pieces (206*a*) having dimensions (e.g., length, width, height) and composition such that the panel (200) has increased flexural stiffness as compared to the panel (200) without the foam (206) and without the hat shaped sections (208*b*).

13. The panel (200) of example 1, wherein the core structure (208) includes hat shaped sections (208*b*) having an aspect ratio and a periodicity and the foam (206) comprises foam pieces (206*a*) having dimensions and composition such that a combination of the inner face sheet (204) and the core structure (208) has a first flexural stiffness (under tension) of at least 40% of a second flexural stiffness (under compression) of the outer face sheet (202), and the inner face sheet (204) does not buckle under a load 274 experienced by a wing (400) including the panel (200) on an aircraft (500) during flight.

14. A body panel for a vehicle (e.g., a car or a drone), a wing, a building, or other structure comprising the panel of any of the examples 1-13.

15. A panel according to any of the examples 1-14, comprising a skin panel comprising an inner skin and exterior skin (or outer skin) with stringers therebetween, wherein the combined stiffness of the inner skin and the stringer is a combined stiffness that is 40-45% of the stiffness of the exterior skin along a relative cross section.

16. A panel according to any of the examples 1-15 that limits warpage and shimming during manufacturing and/or assembly of the panel in an assembly. In another example, the panel has a design that is free from noodle cracking.

17. A panel according to any of the examples 1-16 including the hat structure comprising an internal stiffener comprising a stringer sandwiched between the outer face sheet and the inner face sheet (split-skin) so that the panel comprises a split skin panel:
(1) eliminating or mitigating for compliance of the stringer and impact damage to the stringer. Specifically, the stringers sandwiched between the inner face sheet and the outer face sheets are protected against impact damage so as to eliminate or reduce stringer related instability criteria; and/or
(2) maximizing contribution of the skin (comprising the outer face sheet and the inner face sheet) toward the panel's flexural stiffness.

18. The panel of any of the examples 1-16, wherein the core structure comprises a stringer providing dual load paths so as to improve damage tolerance of the panel or wing box including the panel.

19. The panel of any of the examples 1-18, wherein the core structure comprising a hat structure comprises smaller stringers that are more efficient at improving the panel's flexural stiffness (EI) without mouse holes in the ribs attached to the panel.

20. The panel of any of the examples 1-19, wherein the panel comprises a plank stiffened panel composed of the inner face sheet, the outer face sheet, and the core structure comprising a hat structure, and two layers of adhesive bonding that bond the inner face sheet or the outer face sheet to the hat structure and collectively to form a skin.

21. The panel of any of the examples 1-20 wherein the panel is connected to or comprises spar chords and a core structure consisting essentially of fabric (e.g., all fabric spar chords and hat structure), wherein the panel and core structure are free from warpage and wrinkle typically associated with a tape comprising plies (due to non-existence of thermal or mechanical residual stresses in the layup of the fabric).

22. The panel of any of the examples 1-21, wherein a microstructure and a macro structure of the composite materials in the inner face sheet, the outer face sheets and core structure are designed to achieve efficient layups of the inner face sheet, the outer face sheet, and the core structure that reflect the function and geometry of the layups, and loads applied to the layups, thereby minimizing residual stresses and warpage of the panel.

Block 616 represents assembling the panels into an apparatus 502 (e.g., comprising a wing box or wing).

Examples include, but are not limited to, the following.

23. The apparatus of any of the examples 1-22 comprising a wing box (300), the wing box (300) including:
the panels (200) including a first panel (302) and a second panel (304);
a first spar chord (226*a*) attached to the first panel (302);
a second spar chord (226*b*) attached to the second panel (304); and
a first spar (310) connecting the first spar chord (226*a*) and the second spar chord (226*b*).

24. The apparatus of example 23, wherein the first spar (310), the first spar chord (226*a*), and the second spar chord (308) each comprise a fabric (244) including the fiber tows 240 comprising a plurality of fourth fiber tows (240*d*).

25. A wing (400) comprising the panels (200) of any of the examples 1-22 comprising a first panel (302) and a second panel (304);
a base skin (402) including the second panel (304);
a top skin (404) including the first panel (302);
a wing box (300) including:
a forward spar section (310*a*) including:
a first spar chord (226*a*) attached to the first panel (302) at a first position (P1);
a second spar chord (226*b*) attached to the second panel (304) at a second position (P2); and
a first spar (310) connecting the first spar chord (226*a*) and the second spar chord (226*b*);
an aft spar section (310*b*) including:
a third spar chord (226*c*) attached to the first panel (302) at a third position P3;
a fourth spar chord (226*d*) attached to the second panel (304) at a fourth position (P4); and
a second spar (316) connecting the third spar chord (226*c*) and the fourth spar chord (226*d*); and
wherein:
the first spar (310) and the second spar (316) each extend along a length (405) of an interior (405*b*) of the wing (400) between a root end (406) of the wing (400) and a tip end (408) of the wing (400); and
the first spar (310) and the second spar (316) each intersect with a plurality of ribs (420) directly attached to the base skin (402) and the top skin (404); and
each of the ribs (420) are located within the wing box (300) at a plurality of different locations (407) along the length (405) of the wing (400).

26. An aircraft (500) comprising the wing (400) of example 25.

27. The wing box, wing, or aircraft of any of the examples 1-26, wherein the inner face sheet and the outer face sheet comprise all-tape-ply skins, the core structure comprises all-fabric-plies, the foam comprises a Rohacell foam flay-away tool inside the cavities between the inner face sheet or the outer face sheet and the core structure, and the inner face sheet, the outer face sheet, the foam, and the core structure are co-cured in one or more cure cycles but the spar chords are separately cured. As used herein, a fly away tool is designated as a member that is used for manufacturing the panel but is not removed prior to use of the panel.

28. The wing box or wing of any of the examples 1-27 including ribs, wherein skin including the inner face sheet or the outer face sheet is directly attached to the ribs.

29. The wing box or wing of any of the examples 1-28, without shear ties or with a significantly reduced number of shear ties as compared to the wing box without the panel according to the examples described herein.

The method of making a panel (200) (e.g., according to any of the examples 1-29) is embodied in many ways, including but not limited to, the following.

30. A method of making the panel, comprising laying first face sheet (e.g., inner face sheet 204) comprising a plurality of first fiber tows (240a) disposed in a first tape (238a); laying a plurality of first foam pieces (206a) on the first face sheet; laying a core structure (208) on the plurality of first foam pieces (206a), the core structure (208a) comprising plurality of second fiber tows (240b); laying a plurality of second foam pieces (206a) on the core structure (208); laying a second face sheet (e.g., outer face sheet 204), including a plurality of third fiber tows (240c) disposed in a second tape (238b), on the plurality of second foam pieces (206a) so as to form a structure (208e) including the first face sheet, the second face sheet, the core structure (208), and the foam pieces (206), wherein the first tape (238a), the second tape (238b), and the core structure (208) are pre-impregnated with resin (252) prior to the laying, or comprise preforms with the resin (252) infused after the laying; and curing the structure combined with the resin (252) in an autoclave at a pressure and temperature of at least 300 degrees Fahrenheit, so as to form the structure into a panel (200) having an aerodynamic surface (500a), wherein the foam pieces (206a) and the core structure (208) prevent or reduce warping, buckling or collapse of the first face sheet and the second face sheet under the pressure.

31. The method of example 30, wherein the first face sheet, the second face sheet, and the core structure (208) are co-bonded and co-cured.

32. The method of example 30 or 31, wherein the core structure (208) comprises a stringer (209).

33. The method or panel of any of the examples 1-32, wherein the outer face sheet and the inner face sheet each comprise a laminate of stacked plies.

Advantages and Improvements

Conventional production composite wings closely resemble their aluminum counterparts and exhibit the weaknesses of composite materials. Moreover, not only do open section stringers (a carry-over from aluminum wings) exhibit the weaknesses but they are also incompatible with prepreg tape capability. Therefore, conventional panels are prone to defects and excessive warpage. Blade stringers suffer from noodle cracking and random wrinkles which are the main cause of low stringer pull-off strength. Embodiments described herein address these problems, increasing stiffness of the panel, modulus of the panel, and strength of the panel while also reducing weight and facilitating fabrication and assembly of the panel. Additionally, embodiments described herein avoid noodle cracking (the main cause of low stringer pull-off strength that forces use of shear tied ribs in conventional wing panels).

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
one or more panels each including:
an outer face sheet comprising a plurality of first composite materials;
an inner face sheet comprising a plurality of second composite materials;
a foam disposed between the outer face sheet and the inner face sheet; and
a core structure comprising a plurality of third composite materials:
between the foam and the inner face sheet; and
between the foam and the outer face sheet, wherein the core structure is protected from impact damage and the core structure increases flexural stiffness of the panel.

2. The apparatus of claim 1, wherein:
the foam comprises a plurality of foam pieces and the core structure comprises a hat structure comprising a plurality of hat shaped sections,
each of the hat shaped sections comprise a first sidewall, a second sidewall, and a wall, and
each of the hat shaped sections enclose and locate one of the foam pieces between:
the inner face sheet, the first sidewall, the second sidewall, and the wall, or
the outer face sheet, the first sidewall, the second sidewall, and the wall.

3. The apparatus of claim 2, wherein the outer face sheet comprises a plurality of first plies including a plurality of first fiber tows and the inner face sheet comprises a plurality of second plies including a plurality of second fiber tows.

4. The apparatus of claim 3, wherein the hat structure comprises a fabric including a third plurality of fiber tows.

5. The apparatus of claim 4, wherein the inner face sheet, the outer face sheet, and the hat structure are co-cured and the foam comprises a material that does not degrade at a temperature of at least 350 degrees Fahrenheit.

6. The apparatus of claim 2, wherein the outer face sheet includes a plurality of recesses, each of the recesses seating and locating one of the foam pieces.

7. The apparatus of claim 2, wherein the first plurality of composite materials, the second plurality of composite materials, or the first plurality of composite materials and the second composite materials have a higher stiffness in first regions between the foam pieces as compared to in second regions above or below the foam pieces.

8. The apparatus of claim 1, wherein the core structure comprises a stringer sandwiched between the inner face sheet and the outer face sheet.

9. The apparatus of claim 1, wherein each of the one or more panels have a thickness in a range of 1-5 inches.

10. The apparatus of claim 9, wherein the core structure comprises a hat shaped section having a height in a range of 1/10 inch to 5 inches.

11. The apparatus of claim 1, wherein the foam has a density in a range of 3-15 pounds per cubic feet (lbs/ft³) and a thickness tin a range in of 0.5"<t<2.5".

12. The apparatus of claim 1, wherein the core structure includes a hat shaped section having an aspect ratio and periodicity and the foam comprises foam pieces having dimensions and composition such that each of the panels have increased flexural stiffness as compared to a panel without the foam and without the hat shaped section.

13. The apparatus of claim 1, wherein the core structure includes a hat shaped section having an aspect ratio and a periodicity and the foam comprises foam pieces having dimensions and composition such that a combination of the inner face sheet and the core structure has a first flexural stiffness (under tension) of at least 40% of a second flexural stiffness (under compression) of the outer face sheet and the inner face sheet does not buckle under a load experienced by a wing including the panel on an aircraft during flight.

14. A wing box comprising the apparatus of claim 1, comprising:
the panels including a first panel and a second panel;
a first spar chord attached to the first panel;
a second spar chord attached to the second panel; and
a first spar connecting the first spar chord and the second spar chord.

15. The apparatus of claim 14, wherein the first spar, the first spar chord, and the second spar chord each comprise a fabric including a fourth plurality of fiber tows.

16. A wing comprising the apparatus of claim 1, comprising:
the panels comprising a first panel and a second panel;
a base skin including the second panel;
a top skin including the first panel;
a wing box including:
a forward spar section including:
a first spar chord attached to the first panel at a first position;
a second spar chord attached to the second panel at a second position; and
a first spar connecting the first spar chord and the second spar chord; an aft spar section including:
a third spar chord attached to the first panel at a third position;
a fourth spar chord attached to the second panel at a fourth position; and
a second spar connecting the third spar chord and the fourth spar chord; and
wherein:

the first spar and the second spar each extend along a length of an interior of the wing between a root end of the wing and a tip end of the wing; and
the first spar and the second spar each intersect with a plurality of ribs directly attached to the base skin and the top skin; and
each of the ribs are located within the wing box at a plurality of different locations along the length of the wing.

17. An aircraft comprising the wing of claim 16.

18. A method of making one or more panels, wherein making each one of the panels comprises:
providing an outer face sheet comprising a plurality of first composite materials;
providing an inner face sheet comprising a plurality of second composite materials;
disposing a foam between the outer face sheet and the inner face sheet; and
providing a core structure comprising a plurality of third composite materials:
between the foam and the inner face sheet; and
between the foam and the outer face sheet, wherein the core structure is protected from impact damage and the core structure increases flexural stiffness of the panel so that the one or more panels are made.

19. The method of claim 18, wherein:
the foam comprises a plurality of foam pieces and the core structure comprises a hat structure comprising a plurality of hat shaped sections,
each of the hat shaped sections comprise a first sidewall, a second sidewall, and a wall, and
each of the hat shaped sections enclose and locate one of the foam pieces between:
the inner face sheet, the first sidewall, the second sidewall, and the wall, or
the outer face sheet, the first sidewall, the second sidewall, and the wall, and the method further comprises:
providing the outer face sheet comprising a plurality of first plies including a plurality of first fiber tows;
providing the inner face sheet comprises a plurality of second plies including a plurality of second fiber tows, and
wherein the hat structure comprises a fabric including a third plurality of fiber tows.

20. The method of claim 19, further comprising:
co-curing the inner face sheet, the outer face sheet, and the hat structure; and
providing the foam comprising a material that does not degrade at a temperature of at least 350 degrees Fahrenheit.

* * * * *